April 9, 1957 M. H. DAWSON ET AL 2,788,299

METHOD OF FORMING JUNCTION TRANSISTORS

Filed March 10, 1954

INVENTORS
MAYNARD H. DAWSON
BY NORMAN J. GOLDEN
Paul S. Martin
ATTORNEY

United States Patent Office 2,788,299

Patented Apr. 9, 1957

2,788,299

METHOD OF FORMING JUNCTION TRANSISTORS

Maynard H. Dawson, Ipswich, and Norman J. Golden, Marblehead, Mass., assignors to Sylvania Electric Products Inc., a corporation of Massachusetts

Application March 10, 1954, Serial No. 415,264

1 Claim. (Cl. 148—1.5)

Figure 1:
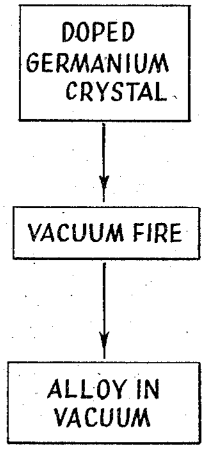

The present invention relates to the fabrication of semiconductor devices. Among the objects of the invention are those to improve the operating characteristics of semiconductor translators, to improve their stability in use, and to extend their reliable life both in use and on the shelf. The invention has special application to the processing of alloy junction germanium transistors, but in broader aspect it applies also to other semiconductive crystals, to other devices such as diodes, and to other known forms of rectifying connections such as the point-contact type. Accordingly the following detailed disclosure deals with this special application through which outstanding gains have been realized, but the invention will be recognized as having considerable merit in other applications.

The illustrative process involves the preparation of a semiconductor body, here of single-crystal germanium that is extremely pure except for a selected donor or acceptor element of group V–B or III–B. This is called a "doping" material or impurity; it is relied on to determine the type of conductivity and the resistivity of the semiconductor. The crystal body is advantageously taken from a large "pulled" single crystal, conventionally cut into slices with a diamond wheel, etched to remove mechanically worked material and to reduce the thickness of the slices to a prescribed dimension, and subdivided into "dice," the individual crystal bodies used in devices.

The doped crystal bodies are subjected to prolonged heat treatment in a hard vacuum. Rectifying connections, applied to the vacuum treated surfaces, exhibit remarkable stability in operation and over a long period of time on the shelf or in use.

In a specially desirable form of transistor, a thin vacuum treated crystal body is subjected to further heat treatment, in alloying rectifying junctions to opposing points on opposite surfaces. This heat treatment is also conducted in vacuum. The resulting transistor is remarkably stable, and has a distinctively improved collector characteristic.

The explanation for the significant gains achieved with the present invention are not fully established. It would seem that the semiconductor in the units previously made may retain an extremely small trace of impurities such as copper and nickel, despite extreme precautions to purify the material. These impurities are rapidly diffusing and are regarded as interstitial impurities, whereas the Group III–B and V–B impurities are slow-diffusing in the crystal and are believed to be lattice impurities in the germanium diamond-cubic lattice. If the rapid-diffusing interstitial impurities are responsible for instability and failure of the finished units, then particularly in the usual alloy junction transistor their presence at the surface should be particularly troublesome since the heating during the alloying process should tend to induce them to migrate and to increase their concentration at the crystal surface. The preliminary vacuum firing of the dice evidently removes copper and the like (see copending application Serial No. 415,310, filed concurrently herewith by Finn and Mayburg); and the relatively shorter period of vacuum firing of the units during the alloying process should remove some residual impurities of this type present in the applied junction material.

The presence of small traces of copper and the like in the junction material would seem to cast doubt on this explanation of the outstanding new results. Another explanation is that the initial vacuum treatment of the dice leaves their surfaces uniformly pure, and that in the hard vacuum there is a sufficient amount of oxygen to form a critical, stable, protective oxide on the crystal; or the oxide may form after the dice are cooled and exposed to air. Substantial improvement in point contact transistors has been realized with vacuum fired dice, lending support to both theories. The excellent electrical characteristics obtainable with the vacuum-alloyed units seem not to be disturbed by a brief aqueous etching treatment; and this would seem to challenge the latter theory.

Figure 2:
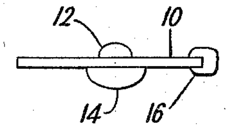

The invention will be better understood from the following detailed example thereof, shown in the accompanying drawings wherein:

Fig. 1 is a flow diagram of an application of certain specific aspects of the invention; and Fig. 2 is a greatly enlarged edgewise view of a transistor prepared in the process represented in Fig. 1.

In fabricating an alloy junction transistor of the p-n-p type in an illustrative procedure, dice of germanium containing a suitable trace of donor impurities such as arsenic or antimony and having a resistivity of the order of 3 to 5 ohm centimeters, are cut from a single large crystal to dice size of .120 inch by 0.3 by .005 inch thick. The dice are etched after slicing and dicing.

The dice, in the physical form in which they are to be incorporated in devices, are vacuum fired. They are, for example, supported on outgassed and pure graphite, in a quartz-walled resistance-heated furnace. Temperatures useful range below the melting point of germanium (950° C.) but above 500° C., for a few hours at 650° C., for example, (shorter times being suitable at higher temperatures) in a pressure of $10^{-4}$ mm. of mercury or less, $5 \times 10^{-5}$ mm. being suitable. This is a better vacuum than obtainable rapidly, using usual mechanical pumps, and is attained with a diffusion pump. Thereafter the dice, conveniently cooled in vacuum and removed from this furnace, are assembled with tiny dots of indium in a graphite crucible, and in the same hard-vacuum furnace are alloyed at 550° C. for about 10 minutes, and allowed to cool with the furnace.

Without etching, collector resistance of the order of a megohm or more is readily attained. The current gain, alpha, is generally high, generally exceeding 0.975; but more significantly, the electrical properties are highly stable in use and retain their original characteristics to a remarkable degree over a period of months, even though freely exposed to ordinary atmosphere and without benefit of an enclosing hermetically sealed envelope. If desired, a brief aqueous etching treatment in a nitric-hydrofluoric-water mixture in the ratio of 5–5–1, of fifteen seconds or less, may be used to adjust the electrical characteristics, followed by careful washing and quick drying.

The foregoing procedure is illustrated in Fig. 1, and is carried out using any suitable apparatus. The finished unit involves a wafer of germanium 10 (Fig. 2) with a small indium dot 12 alloyed on one side and a larger indium dot 14 alloyed to the other side, these dots being formed into alloys with the germanium and constituting closely adjacent rectifying connections to the wafer, formed on the surfaces previously heat-treated in a hard vacuum. An ohmic base connection 16 is applied to wafer 10 during or after the alloying step, to complete the transistor. In place of indium, an alloy of indium or gallium or another group III–B element with lead or with germanium may be applied initially; and where a p-type wafer is used, n-type junction material may be applied initially for forming the alloy rectifying junctions.

It will be understood that a latitude of substitution and varied application of the foregoing disclosure will occur to those skilled in the art, so that the appended claim should be accorded a latitude of interpretation, consistent with the spirit and scope of the invention.

What is claimed is:

The method of forming a junction transistor, including the steps of subjecting a wafer of germanium of N-type electrical conductivity having opposite polished and etched faces to treatment at a pressure not greater than about $10^{-4}$ mm. of mercury and at a temperature of about 650° C. for about three hours, assembling the wafer with the opposite polished and etched faces in engagement with opposed dots of indium, alloying the assembly at about 550° C. for about 10 minutes and at a pressure not greater than about $10^{-4}$ mm. of mercury, and cooling the assembly under vacuum.

References Cited in the file of this patent

UNITED STATES PATENTS

| | | |
|---|---|---|
| 2,505,633 | Whaley | Apr. 25, 1950 |
| 2,561,411 | Pfann | July 24, 1951 |
| 2,597,028 | Pfann | May 20, 1952 |